United States Patent [19]

Plumhans

[11] 3,847,520

[45] Nov. 12, 1974

[54] SEGMENTAL MOLD
[75] Inventor: Leon Paul Jean Plumhans, Grivegnee-Liege, Belgium
[73] Assignee: Uniroyal A.G., Aachen, Germany
[22] Filed: Feb. 26, 1973
[21] Appl. No.: 335,831

[52] U.S. Cl.................. 425/47, 425/39, 425/46
[51] Int. Cl............................................. B29h 5/02
[58] Field of Search............ 425/17, 32, 42, 45, 46, 425/47

[56] References Cited
UNITED STATES PATENTS

| | | | |
|---|---|---|---|
| 3,460,197 | 8/1969 | Cantarutti et al..................... | 425/46 |
| 3,464,090 | 9/1969 | Cantarutti et al................. | 425/46 X |
| 3,659,976 | 5/1972 | Yavorsky et al...................... | 425/42 |
| 3,682,576 | 8/1972 | Gross.................................. | 425/46 |
| 3,703,346 | 11/1972 | Deboeur et al....................... | 425/46 |
| 3,713,929 | 1/1973 | Bottasso et al. .................. | 425/45 X |
| 3,730,658 | 5/1973 | Marra................................. | 425/47 |

FOREIGN PATENTS OR APPLICATIONS

| | | | |
|---|---|---|---|
| 1,109,465 | 10/1968 | Great Britain........................ | 425/32 |
| 1,169,118 | 4/1964 | Germany............................ | 425/17 |
| 1,239,461 | 4/1967 | Germany............................ | 425/45 |

Primary Examiner—J. Howard Flint, Jr.
Attorney, Agent, or Firm—Philip Sands, Esq.

[57] ABSTRACT

A segmental mold comprising a pair of sidewall-shaping members spaced opposite one another and movable axially at least one relative to the other. An annular array of tread-shaping segments is interposed between the members and defines with the latter a mold cavity. The segments are movable radially from an open annular array wherein they are spaced from one another to a closed annular array of reduced extent wherein they abut one another. A fluid-actuated piston is axially engageable with the segments for separating the latter from one another to open to mold.

11 Claims, 5 Drawing Figures 3,847,520

SEGMENTAL MOLD

BACKGROUND OF THE INVENTION

The present invention relates generally to a tire curing press, and more particularly to a tire curing press of the segmental mold variety.

Segmental molds are well known and generally comprise a pair of annular sidewall-shaping members which are spaced coaxially opposite one another and are movable axially at least one toward the other. Interpositioned between the sidewall-shaping members is an annular array of tread-shaping segments. The latter segments are movable radially from an open annular array wherein they are spaced from one another to a closed annular array of reduced extent wherein they abut one another and wherein there is defined with the sidewall-shaping members a tightly sealed mold cavity in which an uncured tire carcass, or raw tire, may be cured and vulcanized. Various arrangements of camming devices are generally utilized for effecting the radial movement of the tread-shaping segments. The segments are, through the intermediary of one of the sidewall-shaping members, generally associated with a number of pressure cylinders having fluid-actuated pistons which are directed against the segments so as to force the latter in a radial direction opposite to that effected by the camming device.

A disadvantage associated with the use of a plurality of independent pressure cylinders is that it is difficult to precisely control the cylinders relative to one another so that the tread-shaping segments with which the cylinders cooperate are urged in a common direction (outwardly or inwardly) by a force of common magnitude. Since the tread-shaping segments are often subjected to extremely high forces during the initial inflation of a raw tire in the mold cavity while the tread-shaping segments are moved from an open annular array to a closed annular array, for example, forces which range in the neighborhood of approximately 15,000 kilograms when curing large truck tires, these forces have varying non-uniform effects upon the pressure cylinders. Since uniform control over all of the cylinders is extremely difficult, there is the possibility of the inadvertent movement of the segments relative to one another and a production of defective tires having imprecise molded profiles.

Another disadvantage associated with the utilization of a plurality of pressure cylinders is that there is required a substantial amount of additional space for accommodating such an arrangement, especially space in a direction axially of the press. It is, therefore, difficult and expensive to modify segmental molds of this variety so that they can be used in conventional-type tire curing presses.

SUMMARY OF THE INVENTION

Accordingly, it is an object of the present invention to provide a novel segmental mold which obviates the above-described disadvantages.

It is another object of the present invention to provide a novel segmental mold having a single member commonly engageable with the tread-shaping segments for effecting radial separation of the latter from one another.

It is still another object of the present invention to provide a novel segmental mold of lesser complexity and of greater reliability than those of conventional nature.

Objects such as those of the above are achieved by providing a segmental mold having a pair of annular sidewall-shaping members which are spaced coaxially opposite one another. The members are supported such that at least one is movable axially relative to the other. An annular array of tread-shaping segments is interposed between the members, and there is provided means for effecting radial movement of the segments from an open annular array wherein the segments are spaced from one another to a closed annular array of reduced extent wherein the segments abut one another. A fluid-actuated piston is commonly engageable annularly with the tread-shaping segments to effect separation of segments from one another and movement of the latter from a closed annular array to an open annular array.

BRIEF DESCRIPTION OF THE DRAWINGS

The above and additional objects and advantages of this invention will be more clearly understood from the following detailed description thereof when read in conjunction with the accompanying drawings, in which:

FIG. 5 is a fragmentary, axially directed, plan view of the ball-bearing assembly illustrated in FIG. 4.

DETAILED DESCRIPTION OF THE INVENTION

Figure 1:
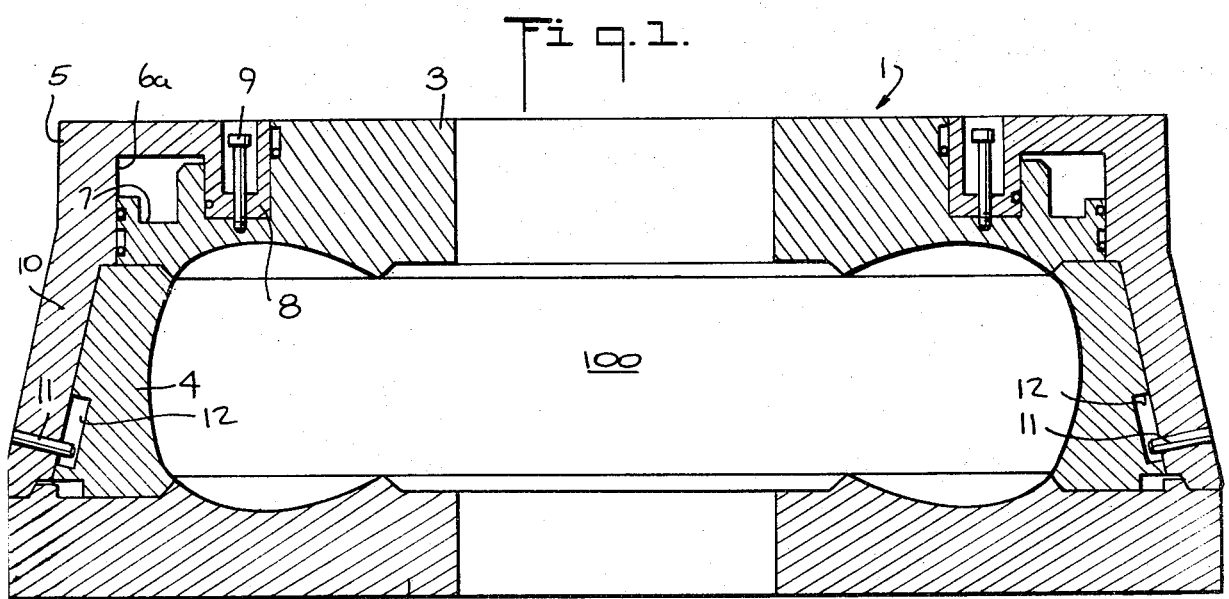
FIG. 1 is an axially taken, cross-sectional view of the segmental mold pursuant to one embodiment of the present invention in a closed position.
Figure 2:
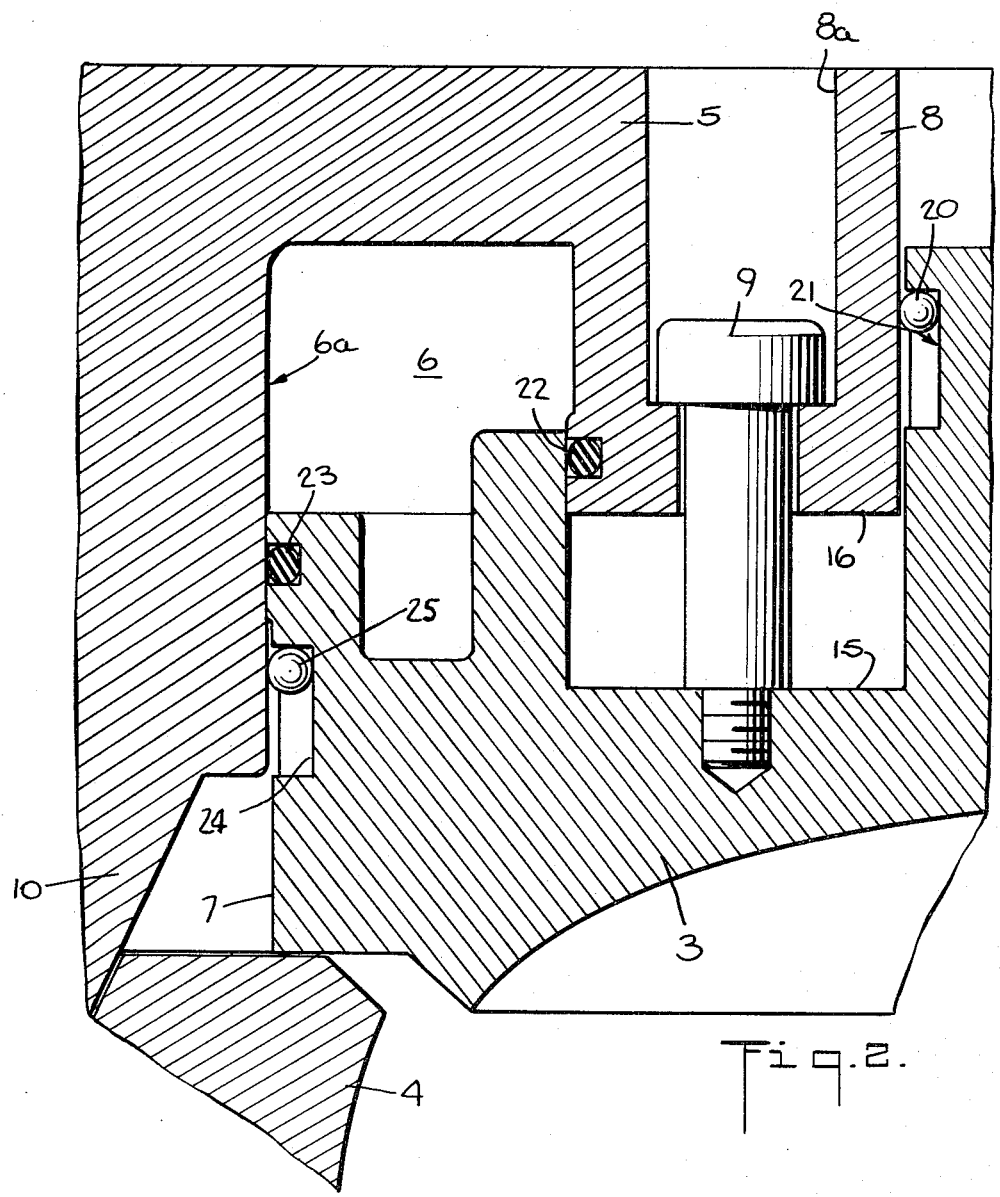
FIG. 2 is an enlarged, fragmentary, axial cross-sectional view of the embodiment illustrated in FIG. 1.
Figure 3:
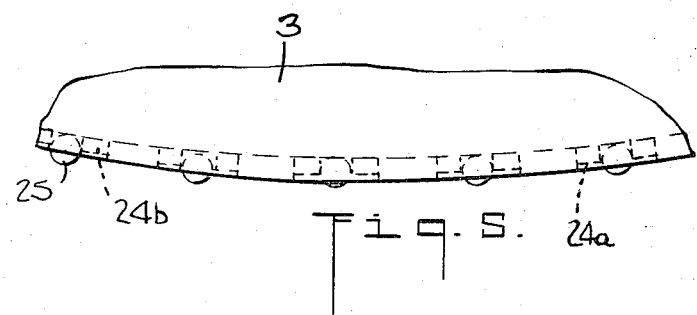

Referring now to the drawings, and more particularly to FIGS. 1 and 2, the present invention relates to a tire curing press of the segmental mold variety. The mold 1 comprises an arrangement of sidewall-shaping members which are of annular extent and are arranged coaxially opposite one another. Preferably, the lower of the sidewall-shaping members, member 2, is stationary and supported by conventional means (not shown). On the other hand, the upper of the sidewall-shaping members, member 3, is supported for axial movement relative to the lower member 2 by conventional means (not shown). Interpositioned concentrically between the sidewall-shaping members 2 and 3 is an annular array of tread-shaping segments 4 which are movable radially from an open annular array wherein the segments 4 are separated from one another to a closed annular array of reduced extent wherein the segments 4 abut one another.

In the formation of a closed annular array, the segments 4, as illustrated in FIG. 1, not only abut one another but are axially abutted by the sidewall-shaping members 2 and 3 likewise. In this formation, there is defined a completely fluid-sealed mold cavity in which a raw tire (an uncured tire carcass) can be effectively cured and vulcanized.

Surrounding the upper sidewall-shaping member 3, is a generally annular-like support member 5 which may be moved (by conventional means not shown) axially toward and away from the lower sidewall-shaping member 2. The support member 5 is provided with a generally frusto-conical skirt 10, the interior of which is effective as a camming surface. In this respect, the exterior surface of each of the segments 4 presents a partially frusto-conical appearance which compliments and slidably engages the inner camming surface of the annular skirt 10. Thus, when the support member 5 is moved axially toward the lower sidewall-shaping member 2, the inner camming surface of the skirt 10 slidingly engages the exterior of the segments 4 and urges them inwardly in a radial direction from an open annular array to a closed annular array.

In one form of an embodiment pursuant to the present invention, the segments 4 and the skirt 10 may be associated with one another through the intermediary of interfitting portions (not shown) which are slidable relative to one another and are utilized for maintaining the segments 4 in abutting relation with the skir 10. For example, the interfitting portions may comprise T shaped slots in the skirt 10, and T-shaped projections extending from the segments 4 and constrained in the slots.

As illustrated in FIG. 1, the annular skirt 10 is provided with a plurality of abutments 11, such as screws or the like, which are associated, respectively, with appropriate slots 12 formed in each of the segments 4. The abutments 11 constitute means for limiting the upper and lower extreme positions that the segments 4 may move into relative to the skirt 10. As illustrated in FIG. 2, each of the segments 4 is in a lower, outer radial position and defines with the others (not shown) an open annular array. The abutments 11 are engaged by the segments 4 in the latter position.

Also, as illustrated in FIG. 2, the support member 5 and the upper sidewall-shaping member 3 are associated with one another so as to define a piston-cylinder type of arrangement. In this respect, the upper sidewall-shaping member 3 is provided with an annular-like piston-acting flange 7 which is slidable in an axial direction within the confines of an annular-like chamber 6 formed in the support member 5. The inner wall of the chamber 6 is defined in part by an inner annular projection 8 formed as part of the support member 5. The projection 8 has a dual purpose. Firstly, it serves as means for providing a secondary wall for assisting in preventing the upper sidewall-shaping member 3 from being inadvertently tilted relative to the support member 5 during axial movement of one relative to the other. Secondly, the projection 8 serves as additional means for assisting in delimiting the extent of axial movement of the upper sidewall-shaping member 3 relative to the support member 5.

In this respect, with regard to the aforementioned first purpose of the projection 8, the outer cylindrical wall of the flange 7 is provided with a circumferential slot in which is constrained an elastomeric type of sealing ring or gasket 23. The gasket 23 is slidingly associated with the inner wall 6a of the support member 5. Thus, the wall 6a of the member 5 serves as first means for preventing the upper sidewall-shaping member 3 from being tilted relative thereto during axial movement of one relative to the other. However, because of the rather large diameter of the cylindrical wall 6a and the relatively small axial extent of the piston-acting flange 7 which is slidably associated with the wall 6a, secondary or additional means for assisting in preventing the upper sidewall-shaping member 3 from being tilted inadvertently relative to the support member 5 are provided. The latter said secondary means refers to the presence of the projection 8 which is slidingly receivable axially in a corresponding annular channel 15 formed in the upper sidewall-shaping member 3. The projection 8 is likewise provided with a circumferential slot in which is constrained an elastomeric sealing ring or gasket 22 which is in sliding contact with the outer wall of the channel 15. The gaskets 22 and 23 are provided for preventing leakage of a pneumatic or hydraulic fluid supplied to the chamber 6 for effecting separation of the members 3 and 5 relative to one another from a source of conventional nature (not shown).

Moreover, extending axially in the annular channel 15, and fixed to the upper sidewall-shaping member 3, are a plurality of elongate studs or pins 9 which slidingly project through corresponding openings formed axially in the projection 8. Each of the pins 9 terminates in an enlarged head acting as abutment means for delimiting the extent of axial separation of the upper sidewall-shaping member 3 relative to the support member 5. The enlarged heads of the pins 9 are axially movable freely internally of an axially directed annular recess 8a formed in the projection 8.

As best illustrated in FIG. 2, the outer cylindrical wall of the piston-acting flange 7 of the upper sidewall-shaping member 3 may be provided with a circumferential array of axially extending recesses 24 which radially confront the cylindrical wall 6a of the chamber 6, each for constraining a respective ball bearing 25. Similarly, the inner cylindrical wall of the chamber 15 formed in the upper sidewall-shaping member 3 may be likewise provided with a circumferential array of axially extending recesses 21 which radially confront the projection 8 and constrain respective ball-bearings 20 therein. The bearings 20 and 25, which engage respective portions of the support member 5, act to substantially reduce friction between the relative sliding surfaces of the upper sidewall-shaping member 3 and the support member 5.

Figure 4:
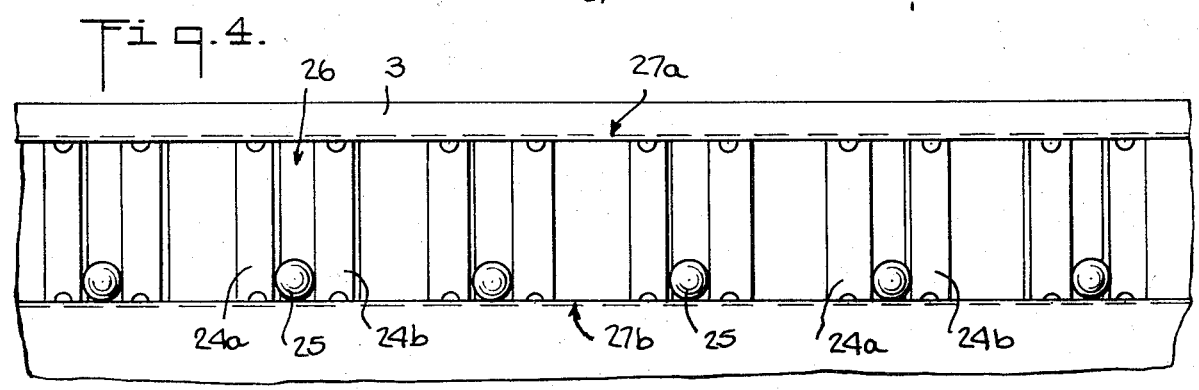
FIG. 4 is an enlarged, fragmentary, radial view of a ball-bearing assembly pursuant to the present invention.

However, as best illustrated in FIGS. 4 and 5, the recesses 21 and 24 for constraining the ball-bearings 20 and 25, respectively, are preferably presented by an assembly comprising a pair of axially spaced annular bands 27a and 27b. Interposed between the bands, and interconnecting the latter to one another, are axially extending spacer members 24a and 24b which, in pairs, act to define therebetween respective axially extending guideways 26 for constraining the ball-bearings 25 in radial engagement with the support member 5. The assembly of the bands and spacer members is arranged so as to be circumferentially adjustable slidingly relative to the respective cylindrical portions of the upper sidewall-shaping member 3, against which the bands abut. The guide-ways 26 in which the bearings 25 are constrained may, therefore, be periodically repositioned. Thus, unused surface portions of the upper sidewall-shaping member 3, against which the respective bearings 25 press against, are used periodically. This tends to diminish the extent of wear of the surface against which the bearings 25 press against and results in a corresponding increase in the longevity of the usefullness of the interacting portions.

Figure 3:
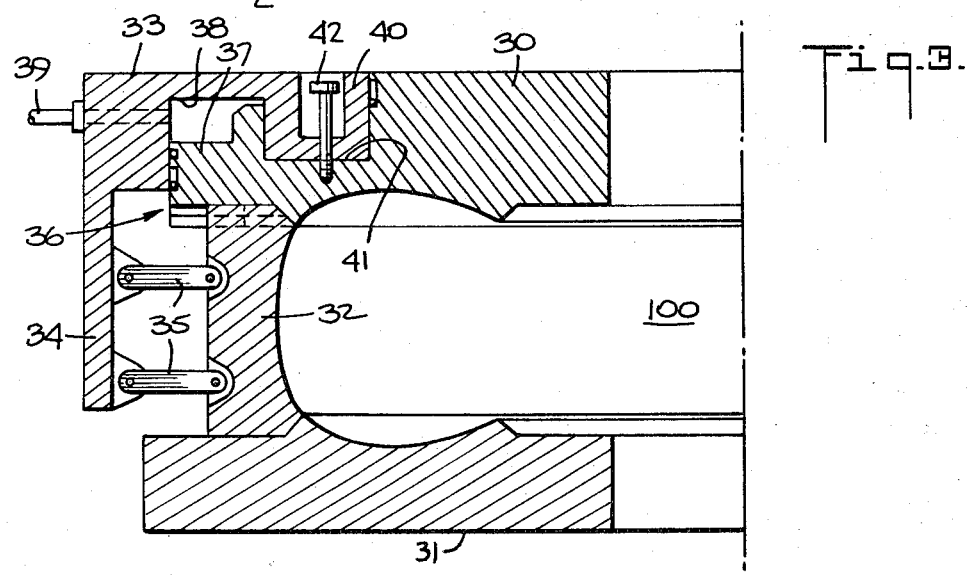
FIG. 3 is a fragmentary, axially taken, cross-sectional view of an alternate embodiment of the present invention.

An alternate embodiment of the mold of the present invention is illustrated generally in FIG. 3. In this respect, the latter segmental mold is defined by a pair of sidewall-shaping members 30 and 31, the member 30 being axially movable relative to member 31. Interposed between the sidewall-shaping members 30 and 31 is an annular array of tread-shaping segments 32. Each of the segments 32 is slidingly associated radially with the upper sidewall-shaping member 30. In this respect, the member 30 may be provided with a circumferential array of radially extending guide slots (for example, of T-shaped cross-section), whereas the upper portion of each of the segments 32 may present a T-shaped coupling projection radialy slidable in, and complimenting, the cross-sectional appearance of the slots in the member 30. For purposes of reducing friction, the cross-sectional extent of the slots in the member 30 is preferably substantially greater than that of the cross-sectional extent of the respective coupling portions of each of the segments 32. Thus, the slots and coupling portions are loosely associated with one another, thereby permitting slight axial movement relative to one another.

Moreover, each of the segments 32 is provided with a pair of links 35 which act to pivotably interconnect the segments 32 to an annular skirt 34 extending axially of a support member 33. The support member 33 is operatively associated with the upper sidewall-shaping member 30 in a manner discussed above for the support member 5 and upper sidewall-shaping member 3 of the embodiment illustrated in FIGS. 1 and 2. The links 35 are of common extent and always remain parallel to one another. The links 35, together with their associated segments 32 and the skirt 34, thereby define what may be characterized as a quadratic linkage. Thus, the segments 32 which are movable axially relative to the skirt 34 always remain in axial parallel relation with one another.

The remainder of the embodiment illustrated in FIG. 3 is generally identical to the arrangement of the embodiment illustrated in FIGS. 1 and 2. In this respect, the alternate embodiment illustrated in FIG. 3 is provided with a piston-cylinder assembly denoted by reference character 36. The piston is formed as part of an annular-like flange 37 extending from the upper sidewall-shaping member 30 and is slidable axially internally of a corresponding chamber 38 formed in the support member 33. The chamber 38 is adapted to receive a pressurized fluid supplied by conventional means (not shown) through the intermediary of a conduit 39 communicating therewith. The support member 33 is provided with an annular projection 40 which is slidably receivable axially in a corresponding annular channel 41 formed in the upper sidewall-shaping member 30. Moreover, free-headed pins 42 are affixed to the upper sidewall-shaping member 30 and freely project axially into an annular recess provided in the projection 40. The provision of the projection 40, pins 42 and an arrangement of ball-bearings (not shown) such as the type illustrated in FIGS. 4 and 5, is such so as to permit effecting of the same objectives as discussed above for the embodiment illustrated in FIGS. 1 and 2.

In operation, whether it be that of the embodiment illustrated in FIGS. 1 and 2, or that of the embodiment illustrated in FIG. 3, the upper sidewall-shaping member 3, 30 is initially axially spaced remotely from the lower sidewall-shaping member 2, 31, and the segments 4, 32 are in an open annular array. A raw (uncured) tire may be inserted between the sidewall-shaping members, and by means of a bladder (not shown) of conventional nature the raw tire may be inflated at least partially. Prior to the inflation of the raw tire, the opposing sidewall-shaping members are brought into greater proximity with one another and into axial engagement with the segments 4, 32. As the segments 4, 32 are moved radially inwardly into a closed annular array wherein they abut one another, the raw tire is inflated.

The closed condition of the segments 4, 32 is illustrated in FIGS. 1 and 3. The necessary final axially directed closing force is effected by means of the support member 5, 33 in that the lower surface 16 of the projection 8, 40 directly bears axially against the upper surface of the annular channel 15, 41 of the upper sidewall-shaping member 3, 30. This causes the piston-acting flange 7, 37 of the upper sidewall-shaping member 3, 30 to press axially against the segments 4, 32 and maintain a tightly sealed mold cavity 100 in which the raw tire may be vulcanized. After vulcanization of the raw tire portions to one another, or curing of the raw tire, the mold is opened to permit removal of the cured tire.

In this respect, in order to effect outward radial movement of the segments 4, 32 from a closed annular array as illustrated in FIGS. 1 and 3 to an open annular array wherein the segments are separated from one another, and permit removal of the cured tire, pressurized fluid is injected into the chamber 6, 38. The pressurized fluid causes the support member 5, 33 to elevate relative to the lower sidewall-shaping member 2, 31, this because of the transmission of an axial force by the piston 7, 38 through the segments 4, 32 and against the lower sidewall-shaping member 2, 31. As a result, the upper and lower sidewall-shaping members and the segments 4, 32 remain constrained against axial movement as the support member 5, 33 ascends and effects a separation of the segments 4, 32 from a closed annular array to an open annular array. This ensures precise control over the segments 4, 32 as the latter move radially out of contact with the cured tire. Final separation of the segments 4, 32 axially from the lower sidewall-shaping member 2, 31 is achieved when the support member 5, 33 and the upper sidewall-shaping member 3, 30 are lifted in unison, through the intermediary of the pins 9, 42, remotely from the lower sidewall-shaping member 2, 31. Movement of the support member 5, 33 and the upper sidewall-shaping member 3, 30 in unison is effected when the free-head of the pins 9, 42 engage the upper surface of the recess in the projection 8, 40 of the support member 5, 33.

Numerous alterations of the structure herein disclosed will suggest themselves to those skilled in the art. However, it is to be understood that the present disclosure relates to preferred embodiments of the invention which are for purposes of illustration only and not to be construed as a limitation of the invention.

What is claimed is:

1. A segmental mold comprising a pair of annular sidewall-shaping members spaced coaxially opposite one another, means for effecting movement of at least a first of said members axially relative to the second of said members, an annular array of tread-shaping segments concentrically interposed between said members, segment-shifting means movable axially relative to both of said members and operatively associated with said segments for effecting radial movement of the latter from an open annular array wherein said segments are spaced from one another to a closed annular array wherein said segments abut one another, said segment-shifting means including an annular portion defining a pressure chamber which is movable relative to said first of said members, and a fluid-actuated annular piston integral with said first of said members and axially displaceable in said chamber, said piston being commonly engageable annularly with said segments for opening the mold by transmitting an axial force downwardly through said segments and against said second of said members to, thereby, effect (a) an uplift of said segment-shifting means relative to said piston, (b) an axial separation of said segment-shifting means from said second of said members and (c) radial movement of said segments, while the latter are still in axial abutment with both of said members, from said closed annular array to said open annular array.

2. A segmental mold as claimed in claim 1, wherein said segment-shifting means includes an axially directed annular projection, said first of said members including means for defining an axially directed annular channel in which said annular projection is slidably constrained axially.

3. A segmental mold as claimed in claim 2, wherein said annular projection is provided with an annular recess, said first of said members including elongate free-headed pins fixed thereto and slidably projecting axially into said annular recess.

4. A segmental mold as claimed in claim 1, wherein said piston includes means for defining a circumferential array of axially elongate recesses which radially confront one wall of said annular chamber, and respective bearings confined in said recesses and slidingly engaging the latter said wall.

5. A segmental mold as claimed in claim 4, wherein the latter said means includes a pair of bands and a plurality of elongate members spaced circumferentially of said bands, said elongate members being axially interposed between and secured to said bands, said bands and elongate members being adjustably movable circumferentially of said annular flange.

6. A segmental mold as claimed in claim 1, wherein said segment-shifting means comprises an inner frusto-conical surface, said segments having outer partially frusto-conical surfaces, respectively, complementing and slidably engageable with said inner frusto-conical surface of said segment-shifting means.

7. A segmental mold as claimed in claim 1, wherein said segment-shifting means comprises an annular skirt surrounding said segments, and linkage means pivotably inter-connecting said segments to said annular skirt.

8. A segmental mold as claimed in claim 7, wherein said linkage means define respective quadratic linkage assemblies with respective ones of said segments and said annular skirt.

9. A segmental mold as claimed in claim 7, wherein said annular flange is provided with an outer circumferential array of radially extending slots, said segments having coupling portions cross-sectionally complimental to and slidingly constrained in said slots, respectively.

10. A segmental mold as claimed in claim 9, wherein said slots are cross-sectionally larger than said coupling portions.

11. A segmental mold as claimed in claim 1, wherein said annular portion of said segment-shifting means is axially engageable with said first of said sidewall-shaping members to exert a downward force against the latter and, thereby, against said segments and said second of said sidewall-shaping members to effect mold closure.

* * * * *